United States Patent
Galli et al.

(10) Patent No.: US 12,504,583 B2
(45) Date of Patent: Dec. 23, 2025

(54) TERMINATED HOLLOW-CORE FIBER WITH SUSPENDED FIBER-END

(71) Applicant: Coherent Scotland Limited, Glasgow (GB)

(72) Inventors: Mara Galli, Glasgow (GB); William Proudfoot, Livingston (GB); Andrew White, Livingston (GB)

(73) Assignee: Coherent Scotland Limited, Glasgow (GB)

( * ) Notice: Subject to any disclaimer, the term of this patent is extended or adjusted under 35 U.S.C. 154(b) by 350 days.

(21) Appl. No.: 18/295,003

(22) Filed: Apr. 3, 2023

(65) Prior Publication Data

US 2023/0324613 A1    Oct. 12, 2023

(30) Foreign Application Priority Data

Apr. 7, 2022 (GB) ..................... 2205145

(51) Int. Cl.
  *G02B 6/24* (2006.01)
  *G02B 6/02* (2006.01)
  (Continued)

(52) U.S. Cl.
  CPC ......... *G02B 6/241* (2013.01); *G02B 6/02304* (2013.01); *G02B 6/02328* (2013.01);
  (Continued)

(58) Field of Classification Search
  CPC ...... G02B 6/02328; G02B 6/262; G02B 6/32; G02B 6/0096; G02B 6/032; G02B 6/241
  See application file for complete search history.

(56) References Cited

U.S. PATENT DOCUMENTS

| 5,737,471 A * | 4/1998 | Sugiyama .......... G02B 6/02033 385/80 |
| 7,379,648 B1 * | 5/2008 | Brooks ............... H01S 3/06754 385/126 |

(Continued)

FOREIGN PATENT DOCUMENTS

| DE | 102016116409 A1 * | 3/2017 | ........... G02B 6/3813 |
| EP | 3812807 A1 * | 4/2021 | ............. C03B 37/15 |

(Continued)

OTHER PUBLICATIONS

Funck et al., Machine Translation of DE-102016116409-A1, Mar. 9, 2017. (Year: 2017).*

(Continued)

*Primary Examiner* — Michelle R Connelly
(74) *Attorney, Agent, or Firm* — Morrison & Foerster LLP (57) ABSTRACT

A terminated hollow-core optical fiber includes an outer capillary having an end-face, a hollow-core optical fiber having a fiber-end located inside the outer capillary a non-zero distance away from the end-face of the outer capillary, a fiber jacket disposed on a surface of the hollow-core optical fiber, and an inner capillary disposed between the fiber jacket and an inner surface of the outer capillary. The inner capillary holds the hollow-core optical fiber via the fiber jacket such that the fiber-end protrudes from the inner capillary and is suspended inside the outer capillary. The terminated hollow-core optical fiber further includes an endcap adjacent the end-face of the outer capillary. This configuration positions the sensitive and potentially fragile fiber-end close to the endcap in a protected environment, while avoiding direct contact between the fiber-end and other mechanical structures, and can be realized without (Continued)

fusing anything to the light-transmitting surfaces of the endcap.

19 Claims, 6 Drawing Sheets

(51) Int. Cl.
  *G02B 6/032* (2006.01)
  *G02B 6/25* (2006.01)
  *G02B 6/26* (2006.01)

(52) U.S. Cl.
  CPC .............. *G02B 6/032* (2013.01); *G02B 6/25* (2013.01); *G02B 6/262* (2013.01); *G02B 2006/0325* (2013.01)

(56) References Cited

U.S. PATENT DOCUMENTS

| | | | |
|---|---|---|---|
| 8,393,804 B2 * | 3/2013 | Nielson | G02B 6/3885 385/35 |
| 8,854,728 B1 | 10/2014 | Brooks et al. | |
| 10,092,356 B2 * | 10/2018 | Griffin | G02B 6/0003 |
| 11,002,919 B2 | 5/2021 | Alkeskjold et al. | |
| 11,269,136 B1 * | 3/2022 | Ho | G02B 27/10 |
| 2007/0008994 A1 | 1/2007 | Yang et al. | |
| 2023/0185019 A1 * | 6/2023 | Campbell | G02B 6/02328 385/125 |

FOREIGN PATENT DOCUMENTS

| | | | | |
|---|---|---|---|---|
| FR | 3039289 A1 | * | 1/2017 | |
| GB | 2171220 A | * | 8/1986 | ........... G02B 6/3869 |
| JP | 2004347991 A | * | 12/2004 | ......... G02B 6/02338 |
| JP | 2007192701 A | * | 8/2007 | ............. G01N 21/65 |
| WO | WO-2022044891 A1 | | 3/2022 | |

OTHER PUBLICATIONS

International Search Report and Written Opinion received for International Patent Application No. PCT/EP2023/059056 mailed on Jun. 2, 2023, 13 pages.
Billotte et al., (2021). "Contaminant-free end-capped and single-mode acetylene photonic microcell for sub-Doppler spectroscopy," Optics Letters, 46(3):456-459.
Search Report received for Great Britain Patent Application No. 2205145.2 mailed on Oct. 6, 2022, 1 page.

* cited by examiner

TERMINATED HOLLOW-CORE FIBER WITH SUSPENDED FIBER-END

CROSS-REFERENCE TO RELATED APPLICATIONS

This application claims the priority of United Kingdom Patent Application No. 2205145.2, filed Apr. 7, 2022, the entire contents of which is incorporated herein by reference.

TECHNICAL FIELD OF THE DISCLOSURE

The present invention relates to the termination of optical fibers. The present invention relates in particular to termination of hollow-core optical fibers for transmission of high optical power in a small-diameter core.

BACKGROUND OF THE DISCLOSURE

An optical fiber is made of an optically transmissive material, usually a glass, that guides light from one end of the fiber to the other. A traditional optical fiber has a solid core with a higher refractive index than a surrounding cladding material. Total internal reflection at the interface between the core and the cladding material causes light to be guided in the core.

Optical fibers confine the guided light to a small cross-sectional area. The light-guiding core in many single-mode optical fibers has a diameter of ten micrometers ($\mu$m) or less. Thus, when an optical fiber is used to transmit high-power laser light, the laser light intensity in the core can be quite high. This can render the optical fiber susceptible to light-induced damage, especially at the ends of the optical fiber where surface contaminants can act as light absorbers that thermally damage the end of the optical fiber. Such damage is often prevented by protective termination of the optical fiber, wherein the end of the optical fiber is fused to a so-called "endcap". The endcap is a solid piece of glass with a much larger diameter than the core of the optical fiber.

Laser light emerging from an optical fiber is highly divergent due to diffraction and the small diameter of the fiber core. Unlike the fiber core, the endcap does not confine the laser beam to a small cross-sectional area. The diameter of the laser beam at the distal surface of the endcap facing away from the optical fiber is therefore usually at least an order of magnitude greater than at the end of the optical fiber itself. The issue of potential interaction between laser light and surface contaminants is displaced to the distal endcap surface where the laser light intensity is smaller and, consequently, light absorption by surface contaminants on the distal surface of the endcap is less likely to damage the endcap. Additionally, due to the larger diameter of the laser beam at the distal surface of the endcap, distortion of the laser beam mode properties by surface contaminants is usually reduced.

Traditional optical fibers with solid cores have certain limitations. Inevitably, the solid core material absorbs and/or scatters some of the light propagating in the optical fiber, resulting in a loss that limits the distance over which a signal can be transmitted. In telecommunication, where light signals are transmitted over long distances, this loss must be compensated for with optical amplifiers. The light-induced damage threshold of the solid core material also imposes an upper limit on the optical power transmittable by the optical fiber. Therefore, traditional optical fibers with solid cores are generally less suitable for transmission of laser light above a certain power. In applications with spectrally broad laser beams, chromatic dispersion in the core temporally broadens the laser beam. In applications with high-peak-power laser pulses, nonlinear processes can cause optical loss or damage the optical fiber.

A hollow-core optical fiber, on the other hand, guides light in a hollow core such that the light propagates in air, in an optically inert gas, or in a vacuum. Hollow-core fibers therefore have significantly reduced absorption/scattering losses and optical nonlinearities compared to traditional solid-core fibers. Hollow-core fibers are also capable of transmitting high-power laser light that exceeds the light-induced damage threshold of solid fiber cores. The notion of a hollow-core fiber was conceived of more than fifty years ago as a low-loss alternative to traditional solid-core optical fibers. The first practical implementations were, however, not realized until the 1990s. These first hollow-core fibers relied on the photonic bandgap effect to guide light in a hollow core surrounded by a microstructured photonic-bandgap cladding having many smaller hollow channels arranged in a honeycomb-like pattern.

More recently, simpler designs have been developed with light-guiding based on antiresonance, that is, destructive optical interference of the component of the light that would otherwise propagate radially away from the optical axis defined by the center of the core. Examples of such simpler designs include Kagome fibers, revolver fibers, and nested-antiresonant-nodeless fibers. In each of these designs, a hollow core is surrounded by a structured cladding that has several hollow channels. The radial component of light undergoes partial reflections at the walls of the structured cladding, and these walls are configured such that the partial reflections interfere in a manner similar to a Fabry-Perot interferometer. There is constructive interference around the center of the core and destructive interference around the structured cladding. As a result, the structured cladding guides light, at the design wavelength, to propagate longitudinally through the hollow core instead of radially outward through the cladding.

SUMMARY OF THE DISCLOSURE

The performance and ease-of-use of hollow-core fibers would benefit from termination with an endcap. Contamination and damage of the ends of a hollow-core fiber presents issues similar to those afflicting traditional solid-core optical fibers. Additionally, if the hollow-core fiber-end is unprotected, moisture from the ambient environment tends to diffuse into the channels of the structured cladding, degrading the light-guiding properties of this structure and even degrading the structure itself.

We have realized that the conventional process of splicing an endcap to the end of an optical fiber is generally unsuitable for hollow-core fibers having a structured cladding. Splicing is usually done by thermally fusing the interface between the optical fiber and the endcap. The heat required to fuse the hollow-core fiber to the endcap tends to melt and deform the thin walls of the structured cladding. Moreover, conventional fusing is incompatible with having an antireflective coating on the surface of the endcap contacting the fiber-end. Conventional fusing of the endcap to the hollow-core fiber would therefore come at the cost of a Fresnel reflection loss at this surface. We have further realized that the end of a hollow-core fiber with a structured cladding is, at least after stripping and cleaving, sufficiently fragile that even simple contact between the fiber-end and an endcap, or other mechanical structure, presents a significant risk of damaging the fiber-end.

Disclosed herein is a hollow-core fiber termination solution that protects the hollow-core fiber with an endcap and is suitable for hollow-core fibers with a structured cladding. The present solution suspends the fiber-end of the hollow-core fiber inside an outer capillary such that the fiber-end is a non-zero distance away from an endcap positioned at the end-face of the outer capillary. The fiber-end is held in place inside the outer capillary by an inner capillary that acts as a radial spacer. This nested-capillary configuration positions the fiber-end close to the endcap in a protected environment, while avoiding direct contact between the fiber-end and other mechanical structures. The nested-capillary configuration allows for precise positioning of the fiber-end relative to the endcap, but is also tolerant to imperfections in the relative positioning of the fiber-end as well as pointing errors of the light beam. The present fiber termination solution can be realized without fusing anything to the light-transmitting surfaces of the endcap, thereby making it straightforward to implement antireflective coatings on both light-transmitting surfaces of the endcap to eliminate, or at least reduce, Fresnel reflection losses.

In one aspect, a terminated hollow-core optical fiber includes an outer capillary having an end-face, a hollow-core optical fiber having a fiber-end located inside the outer capillary a first non-zero distance away from the end-face of the outer capillary, a fiber jacket disposed on an outer surface of the hollow-core optical fiber, and an inner capillary disposed between an outer surface of the fiber jacket and an inner surface of the outer capillary. The inner capillary holds the hollow-core optical fiber via the fiber jacket such that the fiber-end protrudes from the inner capillary and is suspended inside the outer capillary. The terminated hollow-core optical fiber further includes an endcap disposed adjacent the end-face of the outer capillary, to transmit light toward or away from the fiber-end.

In another aspect, a method for terminating a hollow-core optical fiber includes (a) sliding a housing, an inner capillary, and an outer capillary onto a hollow-core optical fiber protected by a fiber jacket, (b) stripping the fiber jacket off a fiber-end of the hollow-core optical fiber, (c) cleaving the stripped fiber-end, (d) positioning the inner and outer capillaries such that (i) the cleaved fiber-end is located inside the outer capillary a non-zero distance from an end-face of the outer capillary and (ii) the inner capillary functions as a radial spacer between the fiber jacket and the outer capillary, with the fiber-end being suspended from the inner capillary, (e) positioning the outer capillary in a channel of the housing, and (f) after the positioning steps, securing an endcap in an opening of the channel of the housing, to situate the endcap adjacent the outer capillary and seal the channel.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE DISCLOSURE

Figures 1A, 1B, 2:
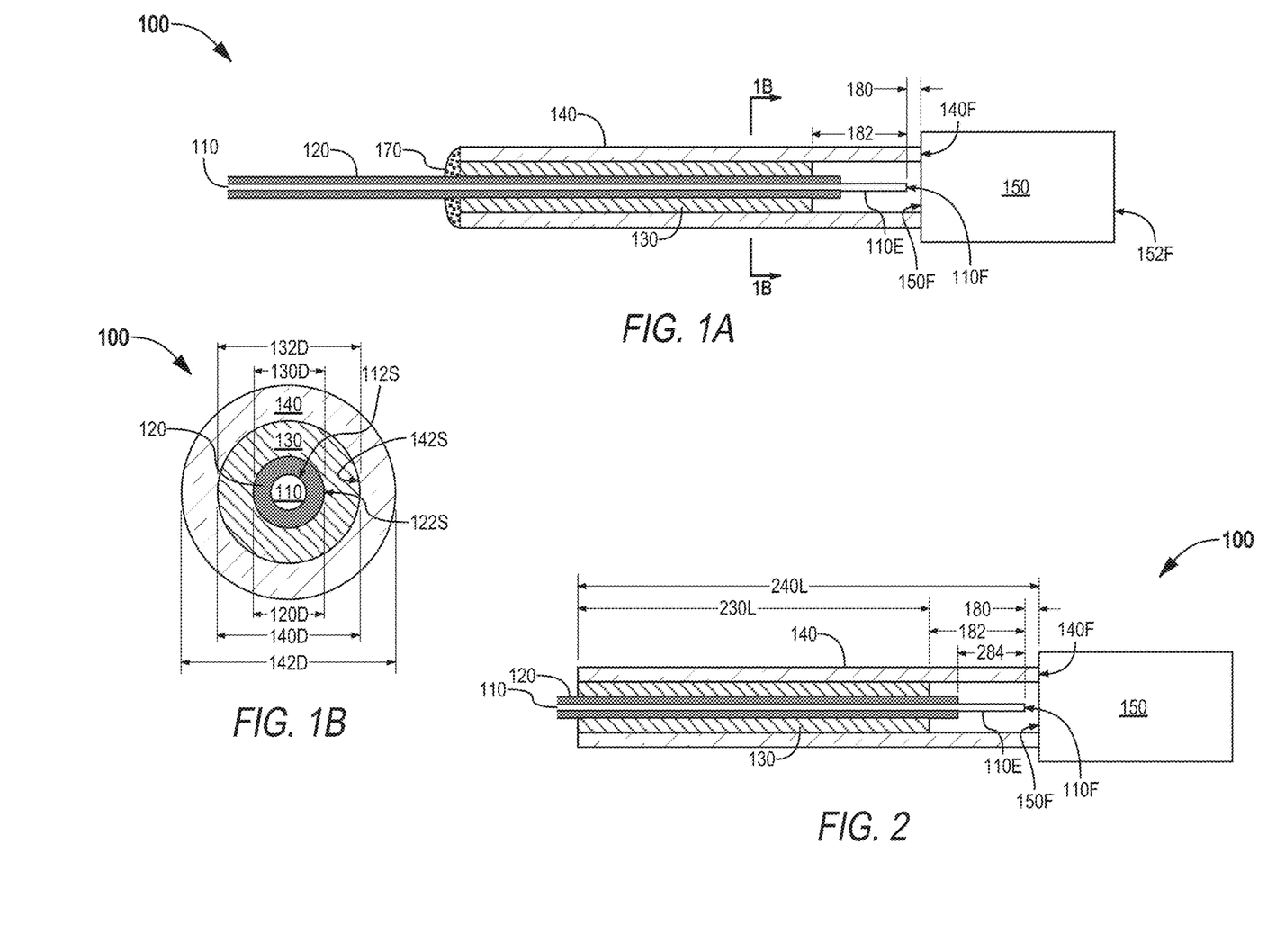
FIGS. 1A and 1B illustrate a terminated hollow-core optical fiber with a nested-capillary configuration that suspends a fiber-end of a hollow-core optical fiber a non-zero distance away from an endcap, according to an embodiment.
FIG. 2 indicates certain exemplary dimensions of the terminated hollow-core optical fiber of FIGS. 1A and 1B.

Referring now to the drawings, wherein like components are designated by like numerals, FIGS. 1A and 1B illustrate one terminated hollow-core optical fiber 100 with a nested-capillary configuration that suspends a fiber-end 110E of a hollow-core optical fiber 110 a non-zero distance away from an endcap 150. FIGS. 1A and 1B are orthogonal cross-sectional views of terminated hollow-core fiber 100. In FIG. 1A, the cross section is taken along a longitudinal axis of hollow-core fiber 110. The FIG. 1B cross section is orthogonal to the longitudinal axis of hollow-core fiber 110 and taken at the location indicated by arrows 1B in FIG. 1A. Hollow-core fiber 110 has a structured cladding. In addition to hollow-core fiber 110 and endcap 150, terminated hollow-core fiber 100 includes a fiber jacket 120, an inner capillary 130, and an outer capillary 140.

Fiber jacket 120 is disposed on an outer surface 112S of hollow-core fiber 110. Hollow-core fiber 110 passes through inner capillary 130, and fiber-end 110E protrudes from inner capillary 130 by a non-zero distance 182. Inner capillary 130 is disposed inside outer capillary 140 between an outer surface 122S of fiber jacket 120 and an inner surface 142S of outer capillary 140. Inner capillary 130 thereby holds hollow-core fiber 110 via fiber jacket 120. Hollow-core fiber 110 is longitudinally positioned such that fiber-end 110E terminates a non-zero distance 180 away from an end-face 140F of outer capillary 140. As a result, fiber-end 110E is suspended from inner capillary 130 inside outer capillary 140. Inner capillary 130 essentially functions as a radial spacer between fiber jacket 120 and outer capillary 140. Endcap 150 is positioned adjacent to end-face 140F of outer capillary 140, with an end-face 110F of fiber-end 110E at least distance 180 away from a light-transmitting surface 150F of endcap 150 facing fiber-end 110E.

Non-zero distance 180 ensures a gap between endcap 150 and fiber-end-face 110F. Inner capillary 130 ensures a significant radial gap between fiber-end 110E and outer capillary 140. With fiber-end 110E suspended in this manner, mechanical contact between fiber-end 110E and other mechanical structures is avoided, thereby protecting the potentially fragile fiber-end 110E from structural damage.

The longitudinal positions of hollow-core fiber 110, inner capillary 130, and outer capillary 140 relative to each other may be locked by an adhesive 170 applied at the far ends of capillaries 130 and 140 (farthest from endcap 150). Although not shown, the far ends of capillaries 130 and 140 may be longitudinally offset from each other. Inner capillary 130 may extend out of outer capillary 140 in the direction away from endcap 150. In this configuration, the portion of inner capillary 130 extending out of outer capillary 140 may provide additional strain relief for hollow-core fiber 110. Alternatively, inner capillary 130 may be entirely contained by outer capillary 140 with both ends of inner capillary 130 being longitudinally displaced from the corresponding ends of outer capillary 140. When the far ends of capillaries 130 and 140 are longitudinally offset from each other, the application of adhesive 170 (if included) may be adapted accordingly, in some instances requiring depositing adhesive 170 at two separate locations.

Light-transmitting surface 150F and the opposite light-transmitting surface 152F of endcap 150 may be planar. In one implementation, endcap 150 is a cylindrical block, as shown in FIG. 1A. In another implementation, endcap 150 takes on a different shape, for example a solid shape that expands radially in the direction from surface 150F to surface 152F such as a conical block. Each of endcap 150, inner capillary 130, and outer capillary 140 may be made of glass. Each of capillaries 130 and 140 may be a hollow cylinder. Fiber jacket 120 may include or consist of a polymer.

The inner diameter 130D of inner capillary 130 may equal the outer diameter 120D of fiber jacket 120, and the outer diameter 132D of inner capillary 130 may equal the inner diameter 140D of outer capillary 140, as shown in FIG. 1B. However, as a practical matter, a gap of, e.g., tens or hundreds of micrometers may exist between inner capillary 130 and each of fiber jacket 120 and outer capillary 140 to ease the process of sliding inner capillary 130 onto fiber jacket 120 and sliding outer capillary 140 onto inner capillary 130. Thus, at least for practical reasons, the inner diameter 130D of inner capillary 130 may exceed the outer diameter 120D of fiber jacket 120, and the outer diameter 132D of inner capillary 130 may be less than the inner diameter 140D of outer capillary 140. In one such example, capillaries 130 and 140 are made of glass, and fiber jacket 120 is made of a polymer. The polymer material of fiber jacket 120 results in substantial friction between fiber jacket 120 and inner capillary 130 when sliding inner capillary 130 onto fiber jacket 120. Moreover, polymer fiber jacket 120 may have significant thickness variation. Therefore, in this example, inner diameter 130D of inner capillary 130 exceeds outer diameter 120D of fiber jacket 120 by at least 100 μm. On the other hand, the friction between glass capillaries 130 and 140 may be relatively small, and their dimensions may be controlled to a higher degree of accuracy. In this example, inner diameter 140D of outer capillary 140 therefore exceeds outer diameter 132D of inner capillary by less than 100 μm, e.g., only a few tens of micrometers. In situations where the thickness of polymer fiber jacket 120 is relatively well controlled, the difference between inner diameter 130D of inner capillary 130 and outer diameter 120D of fiber jacket 120 may be reduced to less than 100 μm, for example a few tens of micrometers. This situation advantageously allows for improved centering of hollow-core fiber 110 relative to outer capillary 140.

In certain embodiments, surface 150F of endcap 150 is seated against end-face 140F of outer capillary 140, as depicted in FIG. 1A. This configuration may help control the distance from fiber-end-face 110F to endcap 150. Endcap 150 may be fused to end-face 140F, bonded to outer capillary 140 by an adhesive, or positioned against end-face 140F by a mechanical structure not shown in FIG. 1A. In embodiments where endcap 150 is bonded to outer capillary 140 by an adhesive, the adhesive may be applied directly at the interface between end-face 140F of outer capillary 140 and surface 150F of endcap 150. However, due to the risk of the adhesive outgassing and thereby potentially contaminating fiber-end-face 110F, it may be preferable to apply the adhesive at a location that is radially outside the interface between outer capillary 140 and endcap 150.

In some scenarios, it is desirable or necessary to minimize Fresnel reflection losses at the light-transmitting surfaces of endcap 150. Advantageously, terminated hollow-core fiber 100 may include an antireflective coating on each of surfaces 150F and 152F for that purpose. It can be challenging to preserve the integrity of an antireflective coating on surface 150F in embodiments where endcap 150 is fused to outer capillary 140 and even in embodiments where endcap 150 is adhered to outer capillary 140. However, it is straightforward to deposit and preserve an antireflective coating on surface 150F in embodiments where endcap 150 and outer capillary 140 are merely positioned in contact with or near each other. Thus, a mechanical structure that holds endcap 150 in this position relative to outer capillary 140 may be advantageous when surface 150F has an antireflective coating. Several such embodiments are discussed below in reference to FIGS. 6, 7, and 9.

The local environment at fiber-end-face 110F may be hermetically sealed off from the ambient environment, to prevent external moisture and contaminants from reaching fiber-end-face 110F and degrading the performance of hollow-core fiber 110. Particularly in embodiments where surface 150F has an antireflective coating, it may be advantageous to incorporate an external housing to provide such sealing. Exemplary housings are discussed in further detail below in reference to FIGS. 6-9. It is however also possible to seal off fiber-end-face 110F from the ambient environment without using an external housing. A direct bond between endcap 150 and outer capillary 140, by an adhesive or by fusing, may cooperate with adhesive 170 to seal both ends of outer capillary 140. Adhesive 170 may be unnecessary for sealing off fiber-end-face 110F from the ambient environment if the fit of inner capillary 130 between fiber jacket 120 and outer capillary 140 is sufficiently tight.

FIG. 2 indicates certain exemplary dimensions of terminated hollow-core fiber 100. Inner capillary 130 and outer capillary 140 have respective lengths 230L and 240L. In embodiments that include adhesive 170, it may be advantageous for length 230L to be relatively substantial in order to prevent or at least reduce contamination of fiber-end-face 110F by outgassing of adhesive 170. In such embodiments, length 230L may be at least 5 millimeters (mm), for example between 5 and 20 mm. When the far ends of capillaries 130 and 140, farthest from endcap 150, are at the same longitudinal position relative to hollow-core fiber 110, as depicted in FIGS. 1A and 2, length 240L exceeds length 230L by the sum of non-zero distances 180 and 182. In one embodiment, distance 180 is at least 50 μm (or at least 100 μm to further reduce the risk of accidental contact between fiber-end 110E and endcap 150), and distance 182 is at least 500 μm, e.g., in the range between 500 μm and 5 mm.

In most implementations, fiber jacket 120 terminates a non-zero distance 284 away from fiber-end-face 110F such that fiber-end 110E protrudes from fiber jacket 120, as depicted in FIGS. 1A and 2. Distance 284 is, for example, in the range between 0.5 and 4 mm. In one scenario, fiber jacket 120 initially extended the full length of hollow-core fiber 110 but was stripped off fiber-end 110E to facilitate cleaving of hollow-core fiber 110 to form fiber-end-face 110F. In embodiments where fiber jacket 120 terminates a non-zero distance 284 away from fiber-end-face 110F, fiber jacket 120 may terminate outside inner capillary 130, as depicted in FIGS. 1A and 2, or inside inner capillary 130. Termination of fiber jacket 120 outside inner capillary 130 provides maximum mechanical support for fiber-end 110E. Termination of fiber jacket 120 inside inner capillary 130 provides the most protection for fiber jacket 120 against potentially damaging laser light exposure. Stripped optical fiber is much more brittle than jacketed fiber. Optical fiber is preferably jacketed when it is in contact with other glass and, therefore, hollow-core fiber 110 may be jacketed along most of length 230L of inner capillary 130.

In one embodiment, inner diameter 140D of outer capillary 140 is at least 0.5 mm, for example in the range between 0.5 and 3 mm. Such values of inner diameter 140D ensure that a laser beam emerging from or coupling into the core of hollow-core fiber 110 at fiber-end-face 110F will not be clipped by outer capillary 140, for a wide range of distances 180 and for mode-field-diameters down to, e.g., 5 micrometers (μm).

Figure 3:
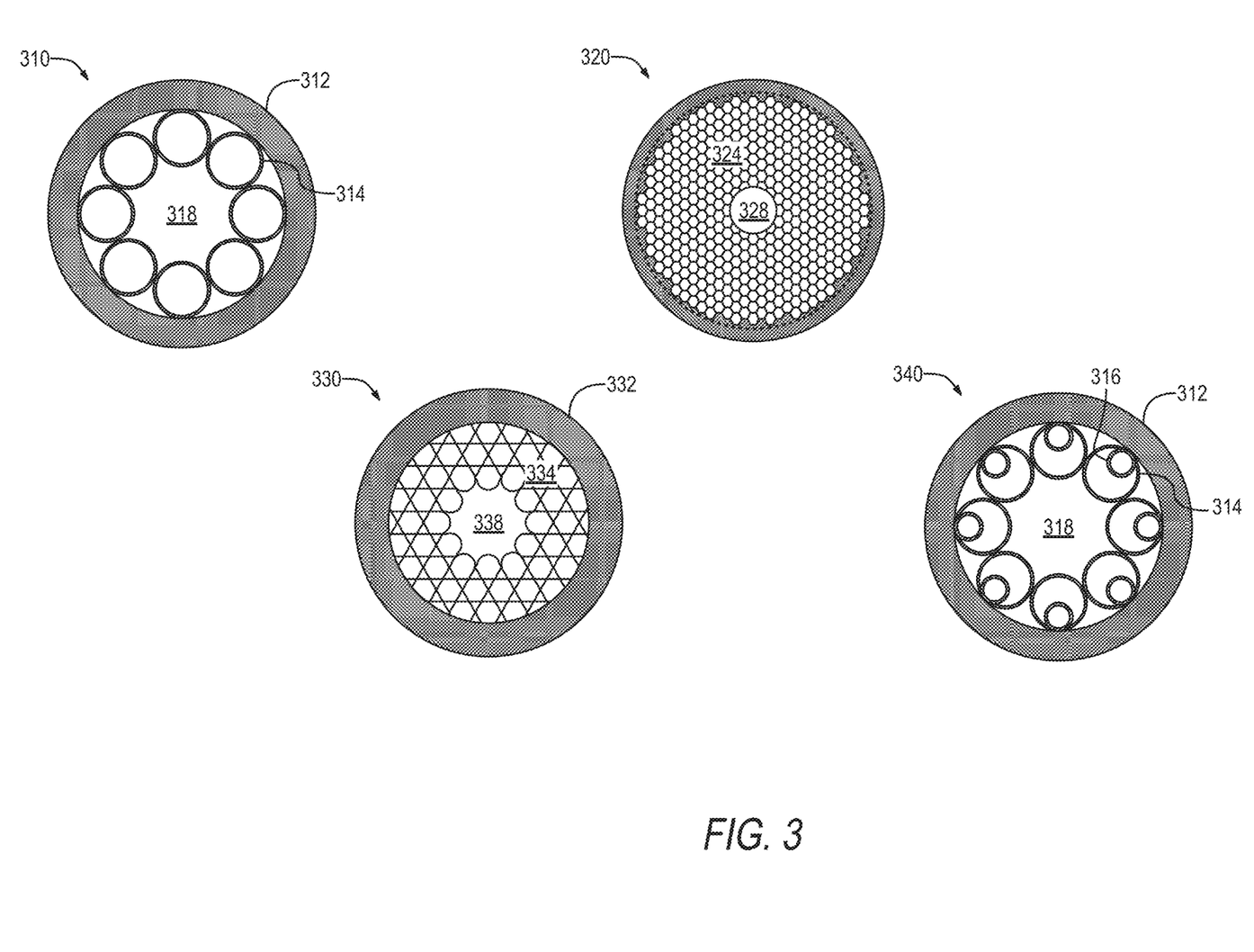
FIG. 3 illustrates examples of hollow-core optical fibers that may be terminated according to the scheme of FIGS. 1A and 1B.

FIG. 3 illustrates examples of hollow-core fibers 110 that may be terminated according to the scheme of terminated hollow-core fiber 100: a revolver fiber 310, a photonic crystal fiber 320, a Kagome fiber 330, and a nested-anti-resonant-nodeless fiber (NANF) 340. FIG. 3 shows a cross-sectional view of each of fibers 310, 320, 330, and 340. The applicability of the termination scheme of terminated hollow-core fiber 100 is not limited to the fiber types shown in FIG. 3.

Revolver fiber 310 includes a plurality of tubes 314 arranged on the interior surface of a solid outer wall 312. Tubes 314 form an antiresonant structured cladding that surrounds a hollow core 318. Photonic crystal fiber 320 has a microstructured cladding 324 with a large number of hexagonal channels arranged in a honeycomb pattern. Microstructured cladding 324 surrounds a hollow core 328. Kagome fiber 330 includes a cladding 334 consisting of thin walls arranged in a trihexagonal tiling pattern known from Japanese Kagome baskets. Cladding 334 is supported by a solid outer wall 332 and surrounds a hollow core 338. NANF 340 is an extension of revolver fiber 310 that further includes a smaller tube 316 inside each tube 314. The presence of tubes 316 reduces the light loss in NANF 340 relative to revolver fiber 310.

Each of revolver fiber 310, photonic crystal fiber 320, Kagome fiber 330, and NANF 340 has a hollow core surrounded by a structured cladding. Many other types of hollow-core fibers have this same basic design, including hexagonal hollow-core fibers, anti-resonant fibers with parachute-shaped cells, and conjoined-tube anti-resonant fibers. Furthermore, many of these types of fibers are commercially available in different versions. For example, a revolver fiber may be configured with adjacent tubes 314 touching each other, as shown in FIG. 3, or with space between each pair of adjacent tubes.

Hollow-core fibers, for example such as those discussed in reference to FIG. 3, may be characterized by relatively small mode-field-diameters. Accordingly, in one embodiment, hollow-core fiber 110 is a single-mode fiber characterized by a mode-field-diameter that is less than 12 μm, for example in the range between 5 and 12 μm. A laser beam emerging from the core of this embodiment of hollow-core fiber 110 at fiber-end-face 110F diverges relatively rapidly. Similarly, effective coupling of a laser beam into the core of this embodiment of hollow-core fiber 110 requires focusing the laser beam tightly on fiber-end-face 110F.

Figure 4:
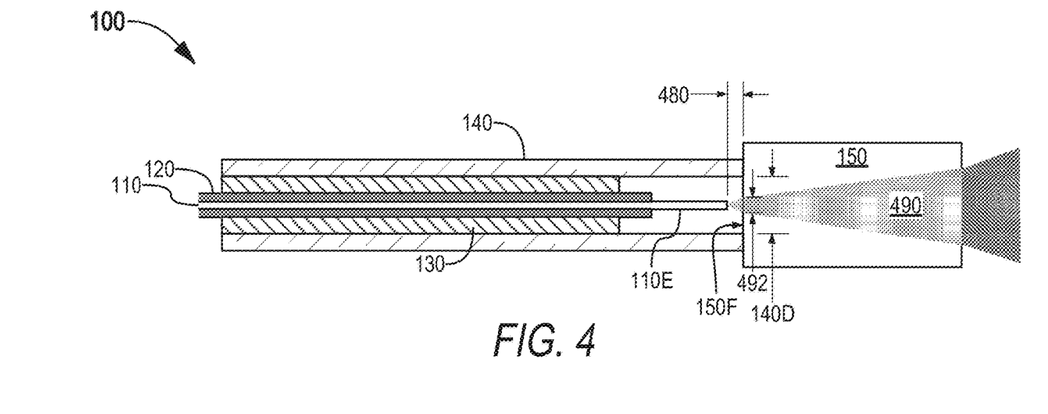
FIG. 4 illustrates light-propagation to or from the hollow-core optical fiber in an example of the terminated hollow-core optical fiber of FIGS. 1A and 1B characterized by a relatively small non-zero distance between the fiber-end-face and the endcap.

FIG. 4 illustrates light-propagation to (or from) hollow-core fiber 110 in one implementation of terminated hollow-core fiber 100 with a relatively small non-zero distance 480 between fiber-end-face 110F and endcap 150. Distance 480 may be in the range between 50 and 500 μm. However, distance 480 may also be less than 50 μm. A laser beam 490 emerging from the core of hollow-core fiber 110 at fiber-end-face 110F is diverging and expands to a transverse $1/e^2$ diameter 492 at surface 150F of endcap 150. Laser beam 490 may be infrared, visible, or ultraviolet. In one scenario, laser beam 490 has a wavelength in the range between 650 and 1100 nanometers (nm).

In one example of the FIG. 4 implementation, hollow-core fiber 110 is a single-mode fiber characterized by a mode-field-diameter of 8 μm, laser beam 490 has a wavelength of 1 μm, distance 480 is 500 μm, and, consequently, $1/e^2$ diameter 492 is approximately 80 μm. For most practical diameters of hollow-core fiber 110, fiber jacket 120, and inner capillary 130, the resulting value of inner diameter 140D of outer capillary 140 is at least 500 μm, such that clipping of laser beam 490 by outer capillary 140 is avoided by a substantial safety margin. When assessing risk of laser beam clipping, it is reasonable to operate with a safety margin of three times the $1/e^2$ diameter 492. In this example, $3 \times 1/e^2$ diameter 492 is approximately 250 μm.

Achieving the relatively small non-zero distance 480 may require special attention during the assembly of terminated hollow-core fiber 100. An optical inspection tool may be used to ensure that distance 480 is as desired. Using such tooling, it may be possible to set distance 480 to within an accuracy of about 50 μm. However, the design of terminated hollow-core fiber 100 is viable also in implementations that do not benefit from a high degree of control of non-zero distance 180. When distance 180 is not tightly controlled, it may be preferable to aim for a conservatively high value of distance 180 to eliminate, with certainty, any risk of fiber-end 110E protruding from outer capillary 140 and potentially being damaged by endcap 150 during assembly.

Figure 5:
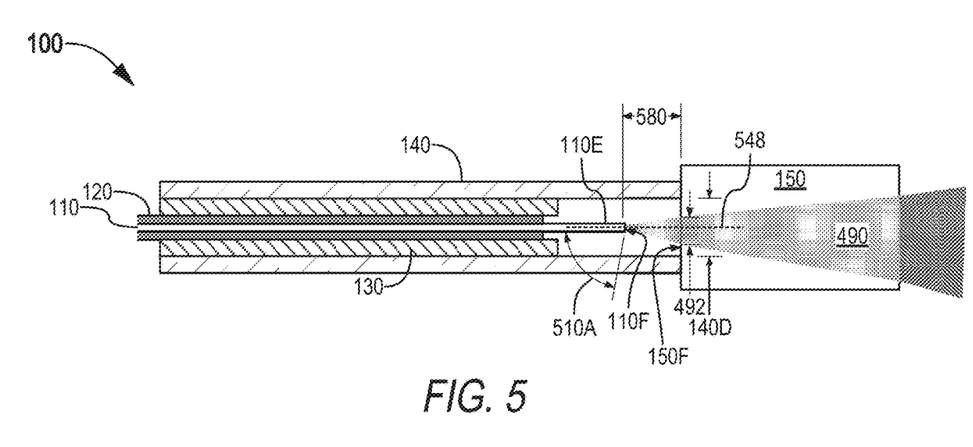
FIG. 5 illustrates light-propagation to or from the hollow-core optical fiber in an example of the terminated hollow-core optical fiber of FIGS. 1A and 1B characterized by a greater non-zero distance between the fiber-end-face and the endcap.

FIG. 5 illustrates light-propagation to (or from) hollow-core fiber 110 in another implementation of terminated hollow-core fiber 100 with a greater distance 580 between fiber-end-face 110F and endcap 150. Distance 580 may be greater than 500 μm, for example several millimeters. The FIG. 5 implementation may pertain to a scenario where the assembly process is configured to ensure that distance 180 is at least 50 μm, while the process sets distance 180 with as much as a ±1 mm tolerance. In a related example of the FIG. 5 implementation, hollow-core fiber 110 is a single-mode fiber characterized by a mode-field-diameter of 8 μm, laser beam 490 has a wavelength of 1 μm, and distance 580 is 2.05 mm. Consequently, $1/e^2$ diameter 492 is approximately 330 μm, and $3 \times 1/e^2$ diameter 492 is slightly less than 1.0 mm. An inner diameter 140D of outer capillary 140 of 1.0 mm or more thus ensures that laser beam 490 is not clipped by outer capillary 140.

The above discussion of clipping of laser beam 490 assumes that the propagation of laser beam 490 between fiber-end-face 110F and endcap 150 is centered on a center axis 548 of outer capillary 140 (see FIG. 5). In the event that the core of hollow-core fiber 110 is not centered on and parallel to center axis 548 and/or fiber-end-face 110F is not orthogonal to center axis 548, laser beam 490 may be propagating at an offset and/or angle to center axis 548. In the example depicted in FIG. 5, fiber-end-face 110F is cleaved at an angle 510A that is oblique with respect to center axis 548, such that laser beam 490 propagates in a slightly downwards direction in the view of FIG. 5. In one example, angle 510A deviates from 90 degrees by up to one or two degrees. Inner diameter 140D of outer capillary 140 may be selected to accommodate such imperfections, optionally in conjunction with a nominal value of distance 180 being relatively large.

Figure 6:
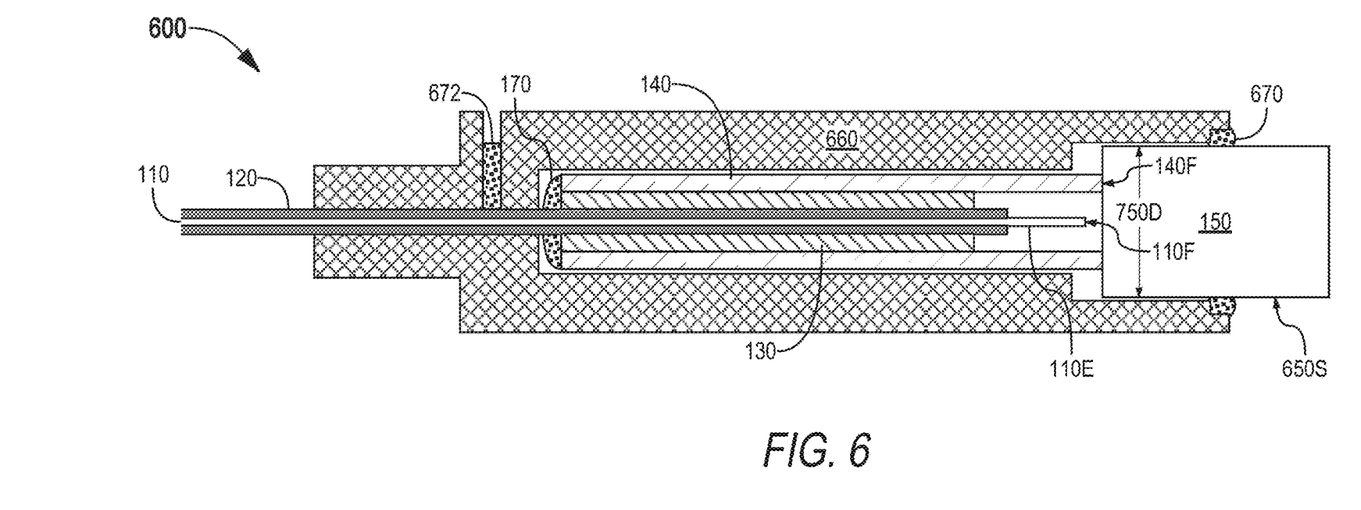
FIG. 6 illustrates a terminated hollow-core optical fiber with a nested-capillary configuration that suspends a fiber-end of a hollow-core optical fiber a non-zero distance away from an endcap, according to an embodiment. This terminated hollow-core optical fiber utilizes a housing for mechanical support and for sealing off the fiber-end-face from the ambient environment.
Figure 7:
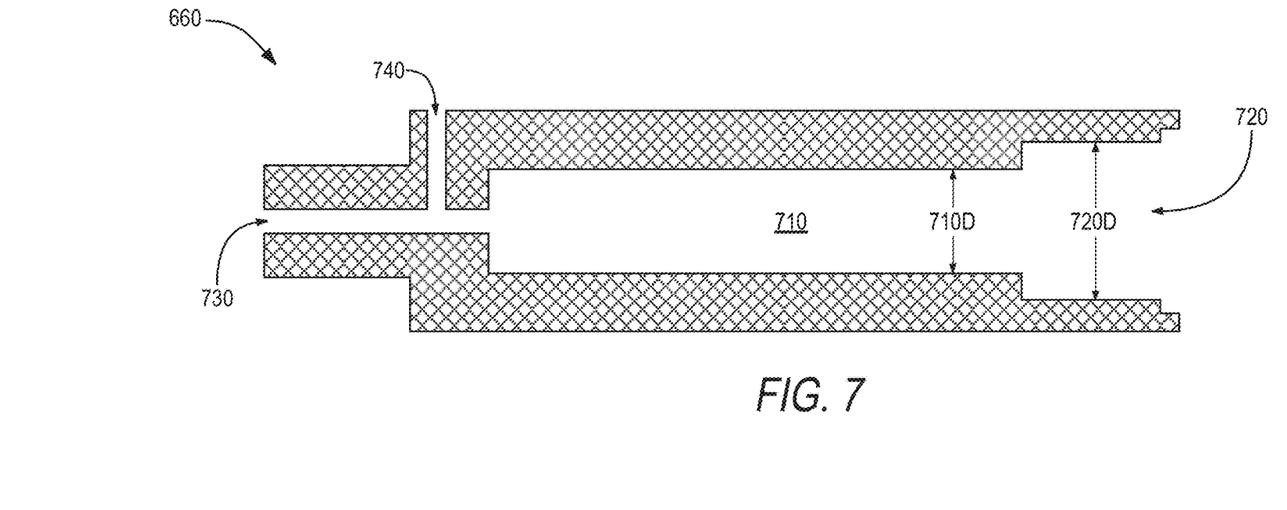
FIG. 7 illustrates the housing of the terminated hollow-core optical fiber of FIG. 6 in further detail.

FIG. 6 illustrates one terminated hollow-core optical fiber 600 that utilizes a housing 660 for mechanical support and for sealing off fiber-end-face 110F from the ambient environment. Terminated hollow-core fiber 600 is an embodiment of terminated hollow-core fiber 100 that further includes housing 660. FIG. 7 illustrates housing 660 in further detail. Housing 660 has a channel 710 with an opening 720. Outer capillary 140 is positioned in channel 710. Housing 660 may be made of metal. Endcap 150 is positioned in opening 720 and seated against end-face 140F of outer capillary 140. Endcap 150 is secured to housing 660. Hollow-core fiber 110 and fiber jacket 120 extend out of housing 660 in the direction away from endcap 150 via a port 730.

Since endcap 150 is secured to housing 660, it is not necessary to secure endcap 150 to outer capillary 140. It is therefore straightforward to include an antireflective coating on surface 150F of endcap 150 (and also on surface 152F) in terminated hollow-core fiber 600.

Optionally, as shown in FIGS. 6 and 7, housing 660 forms a side-port 740. Side-port 740 may accommodate an adhesive 672 that secures hollow-core fiber 110 (and fiber jacket 120) in port 730 so as to lock the position of hollow-core fiber 110 in housing 660.

The diameter 720D of opening 720 may match the outer diameter 750D of endcap 150 and thus help support endcap 150. Alternatively, diameter 720D is greater than diameter 750D, in which case endcap 150 may be supported by housing 660 indirectly via an adhesive and/or mechanical hardware such as set screws or a gasket. (It is assumed here that endcap 150 is cylindrical, but the stated relationships between diameters 720D and 750D are readily extended to other shapes of endcap 150.)

In one embodiment, illustrated in FIG. 6, endcap 150 is bonded to housing 660 by a bead of adhesive 670 that extends around the full circumference of an outer surface 650S of endcap 150. Adhesive 670 secures endcap 150 to housing 660 and seals opening 720 of channel 710. To fully seal off fiber-end 110E from the ambient environment, port 730 is sealed as well. In one example, port 730 is sized to form a snug fit with fiber jacket 120, with fiber jacket 120 being sufficiently pliable to thereby seal port 730. Alternatively, or in combination therewith, port 730 may be sealed by an adhesive 672 applied via side-port 740 of housing 660.

Channel 710 may be cylindrical with a diameter 710D that approximately matches an outer diameter 142D of outer capillary 140 (see FIG. 1B). However, channel 710 does not need to be cylindrical. For example, channel 710 may have a rectangular cross section, and the outer surface of outer capillary 140 may be rectangular as well.

Figure 8:
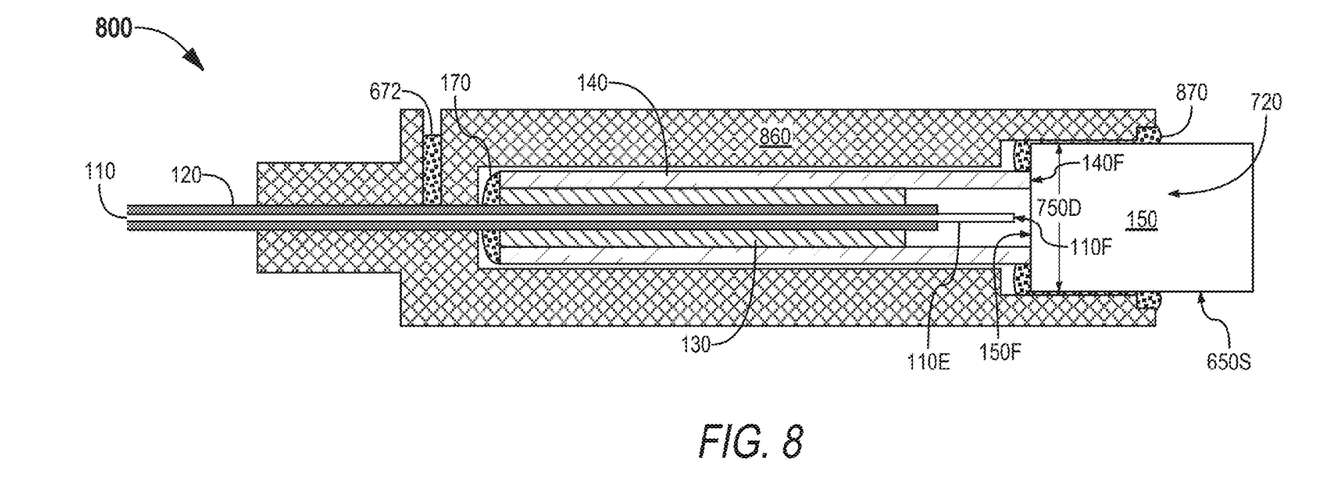
FIG. 8 illustrates another terminated hollow-core optical fiber with a housing, wherein the endcap is secured to both the housing and the outer capillary, according to an embodiment.

FIG. 8 illustrates one terminated hollow-core optical fiber 800 that secures endcap 150 to both a housing and outer capillary 140. Terminated hollow-core fiber 800 is an embodiment of terminated hollow-core fiber 600 that implements a housing 860. In housing 860, which is an embodiment of housing 660, the transverse extent (e.g., diameter 720D) of opening 720 is sized slightly larger than the transverse extent (e.g., outer diameter 750D) of endcap 150. An adhesive 870 forms a bead around the full circumference of surface 650S of endcap 150. In addition, adhesive 870 extends along surfaces 650S and 150F of endcap 150 to outer capillary 140. Adhesive 870 thereby bonds endcap 150 both to housing 860 and directly to outer capillary 140.

The direct bond between endcap 150 and outer capillary 140 may help prevent or reduce any relative movement between endcap 150 and outer capillary 140. Such movement may potentially be caused by vibrations, shock, and thermal expansion/contraction and may generate debris if not prevented. On the other hand, when the risk of generating such debris is small, it may be preferable to maintain a relatively long path length between fiber-end-face 110F and any potentially outgassing adhesive, as in terminated hollow-core fiber 600 where adhesive 670 is farther from fiber-end-face 110F.

Figure 9:
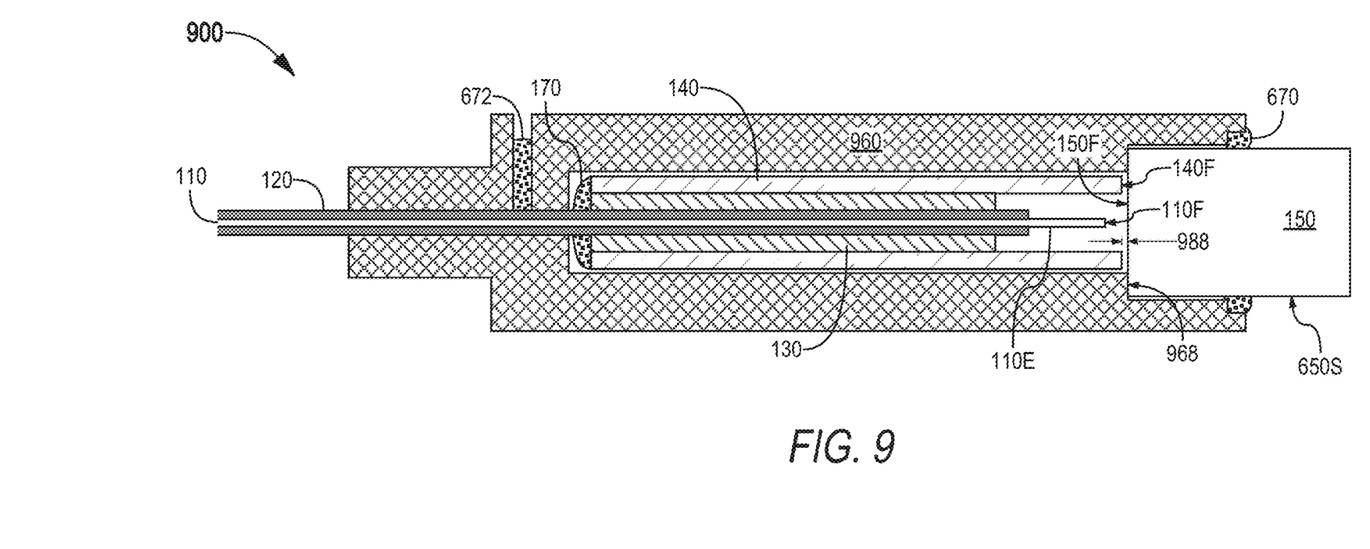
FIG. 9 illustrates another terminated hollow-core optical fiber with a housing, according to an embodiment. The housing holds the endcap a non-zero distance away from the end-face of the outer capillary.

FIG. 9 illustrates one terminated hollow-core optical fiber 900 that holds endcap 150 a non-zero distance 988 away from end-face 140F of outer capillary 140. Terminated hollow-core fiber 900 is a modification of terminated hollow-core fiber 600. In terminated hollow-core fiber 600, outer capillary 140 protrudes from channel 710 into opening 720 such that endcap 150 can be seated against end-face 140F of outer capillary 140. In terminated hollow-core fiber 900, on the other hand, a housing 960 is configured such that outer capillary 140 is entirely contained in channel 710, and surface 150F of endcap 150 is seated on a shelf 968 that is distance 988 away from end-face 140F of outer capillary 140. This prevents direct contact between end-face 140F of outer capillary 140 and surface 150F of endcap 150, such that no debris is generated by movement therebetween and such that an antireflective coating is easily implemented on surface 150F. In one example, distance 988 is less than 250 µm and therefore does not cause a detrimental increase in the total distance between fiber-end-face 110F and endcap 150. Housing 960 is otherwise similar to housing 660.

Figure 10:
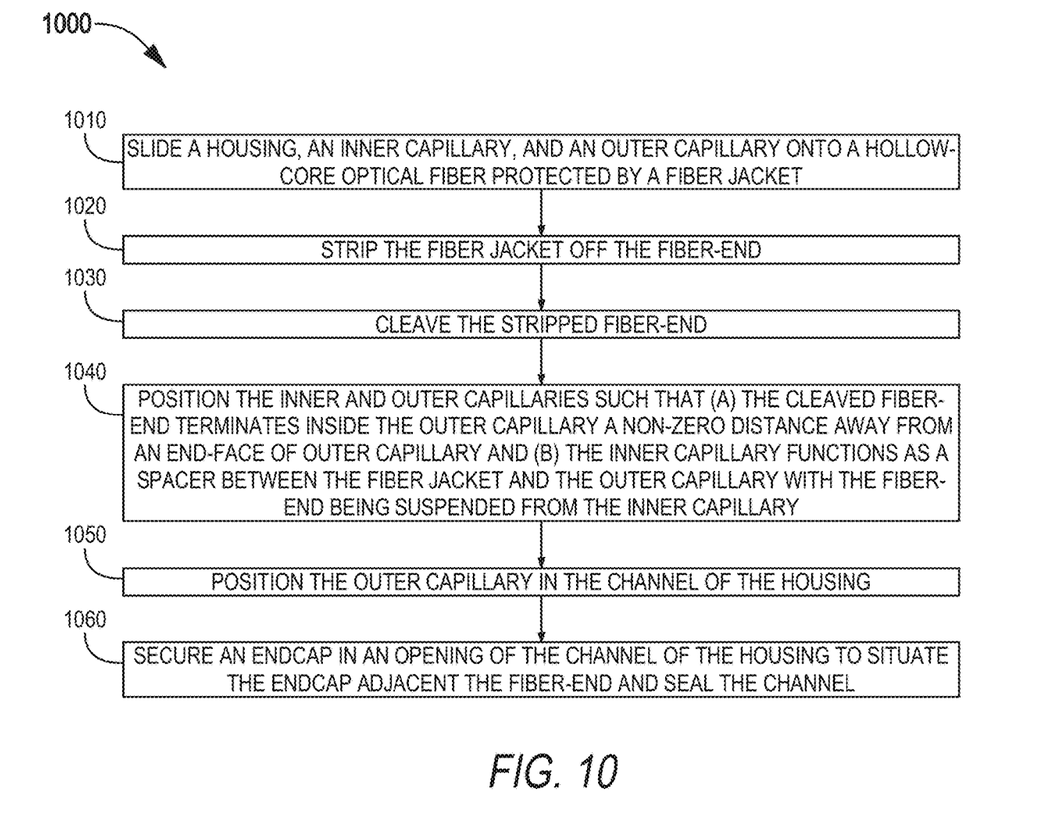
FIG. 10 is a flowchart for a method for terminating a hollow-core optical fiber.

FIG. 10 is a flowchart for one method 1000 for terminating a hollow-core optical fiber. Method 1000 may be used to assemble each of terminated hollow-core fibers 600, 800, and 900. Method 1000 includes steps 1010, 1020, 1030, 1040, 1050, and 1060.

Step 1010 slides a housing (e.g., housing 660, 860, or 960), inner capillary 130, and outer capillary 140 onto hollow-core fiber 110. At this stage of method 1000, hollow-core fiber 110 is protected by fiber jacket 120. Step 1010 positions the housing and capillaries 130 and 140 sufficiently far away from fiber-end 110E to allow for stripping and cleaving of fiber-end 110E. Step 1020 then strips fiber jacket 120 off fiber-end 110E, and step 1030 cleaves the, now stripped, fiber-end 110E.

After stripping and cleaving of fiber-end 110E, step 1040 positions capillaries 130 and 140 such that (a) fiber-end 110E terminates inside outer capillary 140, and (b) inner capillary 130 functions as a radial spacer between fiber jacket 120 and outer capillary 140. Step 1040 results in fiber-end-face 110F being longitudinally offset from end-face 140F of outer capillary 140 by non-zero distance 180, and fiber-end 110E being suspended from inner capillary 130. Step 1040 may include applying adhesive 170 to lock the longitudinal positions of hollow-core fiber 110, inner capillary 130, and outer capillary 140 relative to each other.

After assembling hollow-core fiber 110 (and fiber jacket 120) with capillaries 130 and 140 in step 1040, step 1050 positions outer capillary 140 in channel 710 of the housing. Step 1050 may slide the housing onto the assembly formed in step 1040. Step 1050 may include bonding the housing to fiber jacket 120 to lock the longitudinal positions of the housing and hollow-core fiber 110 relative to each other. In one example, step 1050 applies adhesive 672 in side-port 740 of the housing. Adhesive 672 may further serve to seal port 730 of the housing. When used to assemble terminated hollow-core fiber 600 or 800, step 1050 positions the housing such that outer capillary 140 protrudes into opening 720 from channel 710. When used to assemble terminated hollow-core fiber 900, step 1050 positions the housing such that outer capillary 140 is non-zero distance 988 away from shelf 968.

After step 1050, step 1060 secures endcap 150 in opening 720 of channel 710 to situate endcap 150 adjacent end-face 140F of outer capillary 140. When used to assemble terminated hollow-core fiber 600 or 800, step 1060 seats endcap 150 against end-face 140F of outer capillary 140. When used to assemble terminated hollow-core fiber 900, step 1060 seats endcap 150 on shelf 968. Step 1060 may include bonding endcap 150 to the housing and, optionally, also to outer capillary 140 using adhesive 670 or 870, as discussed above in reference to FIGS. 6 and 8. Adhesive 870 may further serve to seal opening 720.

The present invention is described above in terms of a preferred embodiment and other embodiments. The invention is not limited, however, to the embodiments described and depicted herein. Rather, the invention is limited only by the claims appended hereto.

What is claimed is:

1. A terminated hollow-core optical fiber, comprising:
   an outer capillary having an end-face;
   a hollow-core optical fiber having a fiber-end located inside the outer capillary a first non-zero distance away from the end-face of the outer capillary;
   a fiber jacket disposed on an outer surface of the hollow-core optical fiber;
   an inner capillary disposed between an outer surface of the fiber jacket and an inner surface of the outer capillary, to hold the hollow-core optical fiber via the fiber jacket such that the fiber-end protrudes from the inner capillary and is suspended inside the outer capillary;
   an endcap disposed adjacent the end-face of the outer capillary, to transmit light toward or away from the fiber-end; and
   a housing, the outer capillary being at least partly contained by a channel of the housing, the endcap being disposed in an opening of the channel and secured to the housing.

2. The terminated hollow-core optical fiber of claim 1, wherein the hollow-core optical fiber is a single-mode fiber characterized by a mode-field-diameter of no more than 12 micrometers.

3. The terminated hollow-core optical fiber of claim 1, wherein the fiber-end is between 50 and 500 micrometers from the endcap.

4. The terminated hollow-core optical fiber of claim 1, wherein the outer capillary has an inner diameter of at least 500 micrometers.

5. The terminated hollow-core optical fiber of claim 1, wherein the endcap has two light-transmitting surfaces respectively facing toward and away from the fiber-end, each of the two light-transmitting surfaces including an antireflective coating.

6. The terminated hollow-core optical fiber of claim 1, wherein the endcap is seated against the end-face of the outer capillary.

7. The terminated hollow-core optical fiber of claim 1, wherein the outer capillary and the endcap are made of glass.

8. The terminated hollow-core optical fiber of claim 1, wherein the endcap is seated on a shelf of the opening, and a gap exists between the endcap and the outer capillary.

9. The terminated hollow-core optical fiber of claim 8, wherein the gap is less than 250 micrometers.

10. The terminated hollow-core optical fiber of claim 1, wherein the endcap is secured to the housing by a first adhesive that seals the opening around the endcap.

11. The terminated hollow-core optical fiber of claim 1, wherein the hollow-core optical fiber and the fiber jacket extend out of the housing via a port, the port and the opening being at opposite ends of the channel, the port being sealed.

12. The terminated hollow-core optical fiber of claim 1, wherein the housing is made of metal.

13. The terminated hollow-core optical fiber of claim 1, wherein the inner capillary has a length of at least 5 millimeters.

14. The terminated hollow-core optical fiber of claim 1, wherein the endcap is seated against the end-face of the outer capillary and bonded to the outer capillary.

15. The terminated hollow-core optical fiber of claim 1, wherein the fiber-end protrudes from the inner capillary by at least 500 micrometers.

16. A terminated hollow-core optical fiber, comprising:
   an outer capillary having an end-face:
   a hollow-core optical fiber having a fiber-end located inside the outer capillary a first non-zero distance away from the end-face of the outer capillary;
   a fiber jacket disposed on an outer surface of the hollow-core optical fiber:
   an inner capillary disposed between an outer surface of the fiber jacket and an inner surface of the outer capillary, to hold the hollow-core optical fiber via the fiber jacket such that the fiber-end protrudes from the inner capillary and is suspended inside the outer capillary; and
   an endcap disposed adjacent the end-face of the outer capillary, to transmit light toward or away from the fiber-end;
   wherein respective ends of the inner and outer capillaries, farthest from the endcap, are adhered to each other.

17. A method for terminating a hollow-core optical fiber, comprising steps of:
   sliding a housing, an inner capillary, and an outer capillary onto a hollow-core optical fiber protected by a fiber jacket;
   stripping the fiber jacket off a fiber-end of the hollow-core optical fiber;
   cleaving the stripped fiber-end;
   positioning the inner and outer capillaries such that (a) the cleaved fiber-end is located inside the outer capillary a non-zero distance from an end-face of the outer capillary and (b) the inner capillary functions as a radial spacer between the fiber jacket and the outer capillary, with the fiber-end being suspended from the inner capillary;

positioning the outer capillary in a channel of the housing; and after the positioning steps, securing an endcap in an opening of the channel of the housing, to situate the endcap adjacent the outer capillary and seal the channel.

18. The method of claim 17, wherein the positioning and securing steps result in the fiber-end being located between 50 and 500 micrometers from the endcap.

19. The method of claim 17, wherein the securing step includes applying an adhesive between the endcap and the housing, the adhesive spanning along a full circumference of the endcap.

\* \* \* \* \*